United States Patent [19]

Groenendaal et al.

[11] 4,276,649

[45] Jun. 30, 1981

[54] RECEIVER FOR DIGITAL SIGNALS IN LINE CODE

[75] Inventors: Gradus C. Groenendaal; Einar A. Aagaard, both of Eindhoven, Netherlands

[73] Assignee: U.S. Philips Corporation, New York, N.Y.

[21] Appl. No.: 50,712

[22] Filed: Jun. 21, 1979

[30] Foreign Application Priority Data

Jun. 30, 1978 [NL] Netherlands .................. 7807171

[51] Int. Cl.³ .............................................. G06F 11/00
[52] U.S. Cl. ............................................. 371/55; 371/8; 371/11; 371/56
[58] Field of Search .................. 371/55, 56, 8, 11, 5; 370/16

[56] References Cited

U.S. PATENT DOCUMENTS

| | | | |
|---|---|---|---|
| 3,436,730 | 4/1969 | Widel | 371/55 |
| 3,526,837 | 9/1970 | Zegers et al. | 371/8 |
| 3,652,988 | 3/1972 | Yamamoto et al. | 371/55 |
| 3,781,795 | 12/1973 | Zegers | 371/8 |
| 3,840,855 | 10/1974 | Ameau et al. | 371/55 |

FOREIGN PATENT DOCUMENTS 696098  10/1964 Canada ................................. 371/55

*Primary Examiner*—Charles E. Atkinson
*Attorney, Agent, or Firm*—Thomas A. Briody; William J. Streeter; Edward W. Goodman

[57] ABSTRACT

Receiver for a digital line code signal. This receiver comprises a line code decoder and a digital-to-analog converter. To reduce the audibility of bursts this receiver also comprises a line-code violation detector detecting whether the received signal deviates from the line code; as well as a pulse generator. Each time the line-code violation detector detects that the received signal deviates from the line code, the output signal of the pulse generator is applied to the digital-to-analog converter instead of the output signal of the line code decoder.

2 Claims, 8 Drawing Figures

RECEIVER FOR DIGITAL SIGNALS IN LINE CODE

A. BACKGROUND OF THE INVENTION

A(1). Field of the invention

The invention relates to a receiver, particularly for use in a digital telecommunication system, which is arranged for receiving a line signal formed by a first digital signal, encoded in a line code and representing a digital version of an analog information signal, the receiver comprising:

an input for receiving said line signal;

a decoder coupled to said input and arranged for converting the line signal into said first digital signal a digital-to-analog converter comprising an input;

means for coupling the input of the digital-to-analog converter to the receiver input.

A(2). Description of the prior art

In recent years high-speed digital base band transmission over existing coaxial cables has received a great deal of interest. Due to their particular structure coaxial cables provide high transmission quality. These cables are substantially immune to crosstalk and impulse interferences. Thermal noise being generated by the cable itself as well as by the associated equipment such as equalisers and amplifiers in the regenerative repeaters is usually the major source of interference to the pulses of the pulse signal to be transmitted. Another quantity which must be taken into consideration is the low-frequency cut-off of the transmission path due to the inductive or capacitive coupling of the cable to the signal sources. To prevent the digital signal applied to the cable from having relevant frequency components which are lower than the low-frequency cut-off frequency, it is customary to subject the digital signal to be transmitted, before it is applied to the cable, to a coding method, whereby a digital signal is obtained in a so-called line code (see the reference in paragraph D). The last-mentioned signal will be denoted the line signal hereinafter.

Apart from the fact that the line signal does not contain frequency components which are lower than the said low-frequency cut-off frequency, the line code is usually chosen so that the line signal has more 0-1 transitions than the original signal, so that clock extraction and regeneration can be done in a simple manner.

Although the transmission quality of the existing cables is very good, bit errors can still be produced by external influences. These errors are audible irrespective of whether the first digital signal is a pulse code modulated signal or a delta modulation signal. A delta modulation signal is indeed less sensitive to bit errors than a pulse code modulated signal, but, particularly, "error bursts", that is to say multiple errors such as sequences of identical bits, resulting from protractedly dominating noise pulses in a transmission medium are very annoying, even with delta modulation.

B. SUMMARY OF THE INVENTION

It is an object of the invention to reduce in a receiver of the type described in paragraph A(1) the audibility of error bursts in a particularly simple manner.

According to the invention this receiver therefore further comprises:

a line-code violation detector coupled to said input of the receiver and arranged to detect whether the line signal shows deviations from the line code;

a generator for producing a second digital signal; said coupling means being further provided with a control input and arranged for selectively coupling the input of the digital-to-analog converter to the receiver input and to the generator and further means are present for coupling this control input to the line-code violation detector.

C. SHORT DESCRIPTION OF THE FIGURES

D. REFERENCE

Line coding techniques for baseband digital transmission; N.Q. Duc; Australian Telecommunication Research, Vol. 9, No. 1, 1975.

E. DESCRIPTION OF THE EMBODIMENTS

E(1). General structure

Figure 1:
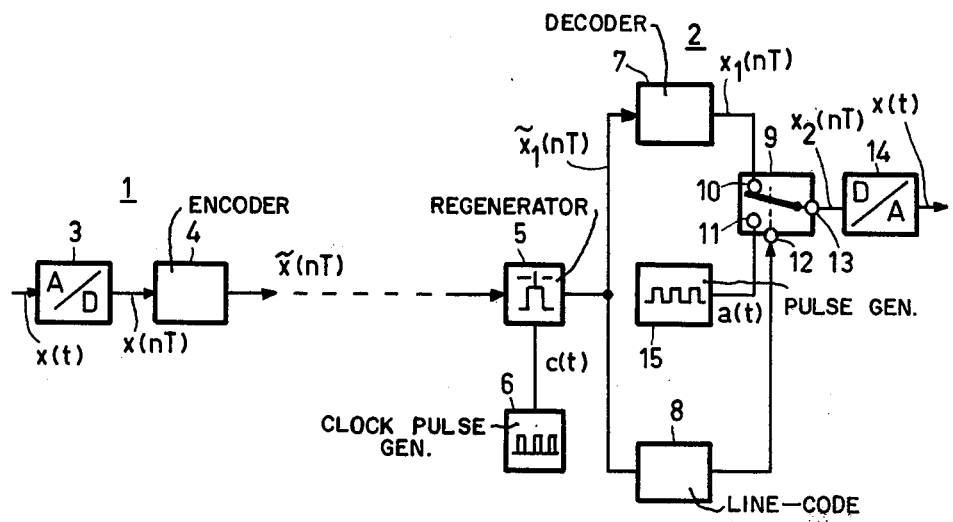
FIG. 1 shows a transmission system having a transmitter and a receiver.

FIG. 1 shows a transmission system comprising a transmitter 1 and a receiver 2. The transmitter 1 is provided with an analog-to-digital converter 3 to which an analog signal x(t) is applied. For a proper notion it will be assumed that the A/D-converter 3 is constituted by a delta modulator whose output bits occur with a period T. However, the following also holds if this A/D converter 3 were consituted by a PCM encoding device producing codewords which each contain a plurality of bits, these bits occuring with said period T.

The signal x(nT) produced by the A/D converter 3 is thereafter applied to an encoder 4 which encodes this digital signal x(nT) into, for example, a first order bipolar code. The signal produced by this encoder 4 is denoted in the figure by x(nT) and is the above-mentioned line signal. If now more particularly the signal x(nT) has the form shown at a in FIG. 2, then x(nT) has the form shown at b in FIG. 2.

Figure 2:
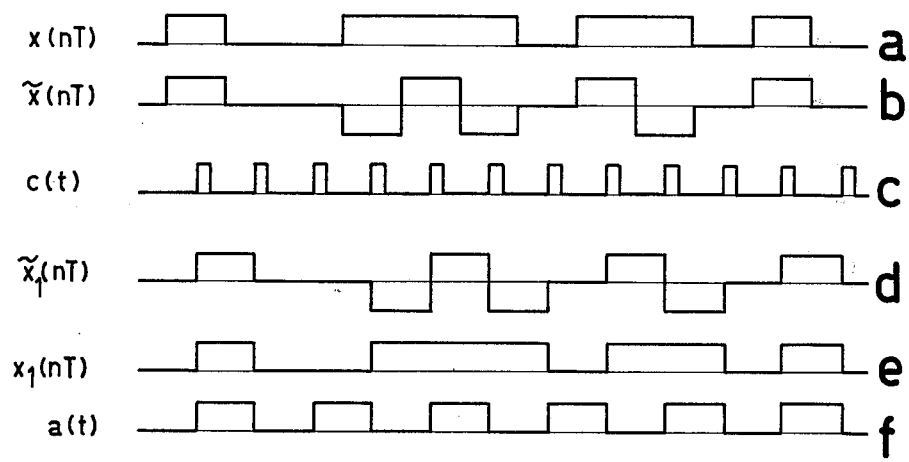
FIG. 2 shows some time diagrams for explaining the transmission system, shown in FIG. 1, if no error bursts occur.

The line signal $\bar{x}(nT)$ produced by the encoder 4 and having the above-described properties is now transmitted to the receiver 2. This receiver comprises a regenerator 5 to which $\bar{x}(nT)$ is applied, as well as a clock pulse signal c(t). This clock pulse signal whose shape is shown at c in FIG. 2 is generated by a clock pulse generator 6 and formed by clock pulses occurring at a period T. Each time $\bar{x}(nT)$ is located, at the clock instant, above a predetermined positive threshold voltage, the regenerator 5 produces a "+1"-pulse, and a "−1" pulse each time $\bar{x}(nT)$ is below a predetermined negative threshold value at the clock instant, and a "0" pulse each time $\tilde{x}(nT)$ is between the two threshold values. Usually the threshold values are equal to one another in the absolute sense and approximately equal to half the expected height of the pulses in $\tilde{x}(nT)$. In response to the signal $\tilde{x}(nT)$ applied to it, the regenerator 5 produces the signal $\tilde{x}_1(nT)$ whose shape is fully identical to the signal $\tilde{x}(nT)$ if the transmission medium does not introduce errors in $\tilde{x}(nT)$. For completeness this signal $\tilde{x}_1(nT)$ is shown at d in FIG. 2.

Connected to the output of the regenerator 5 are a decoder 7 and a line-code violation detector 8. In addition, this receiver 2 comprises a switch 9, shown schematically only, having two signal inputs 10 and 11, a control input 12 and an output 13. More particularly, the signal input 10 is connected to the output of the decoder 7. The control input 12 is connected to the output of the violation detector 8 while the input 13 is connected to the output of a digital-to-analog converter 14 which produces the desired signal x(t). This receiver comprises further a pulse generator 15 the output of which is connected to the signal input 11 of the switch 9.

In the case considered here of the first order bipolar code, the decoder 7 has a function corresponding to that of a full-wave rectifier. This means that the signal $\tilde{x}_1(nT)$ shown at d in FIG. 2 is converted by this decoder into the signal $\hat{x}_1(nT)$ shown at e in FIG. 2. The structure of this decoder will be further described hereinafter.

The line-code violation detector 8, whose structure will also be described in greater detail hereinafter, is arranged to detect violation of the bipolar line code. Namely, if, owing to a serious disturbance of the signal $\tilde{x}(nT)$, a signal whose properties no longer satisfy the bipolar code rule is obtained in the input of the regenerator 5, the violation detector 8 connects the input of the D/A converter 14, which is normally connected to the output of the decoder 7, to the output of the pulse generator 15.

Said pulse generator 15 is, for example, of such an implementation that it produces an alternating sequence of "+1"-pulses and "0"-pulses. The signal produced by this pulse generator 15 and which will be denoted as a(t) is shown at f in FIG. 2.

Figure 3:
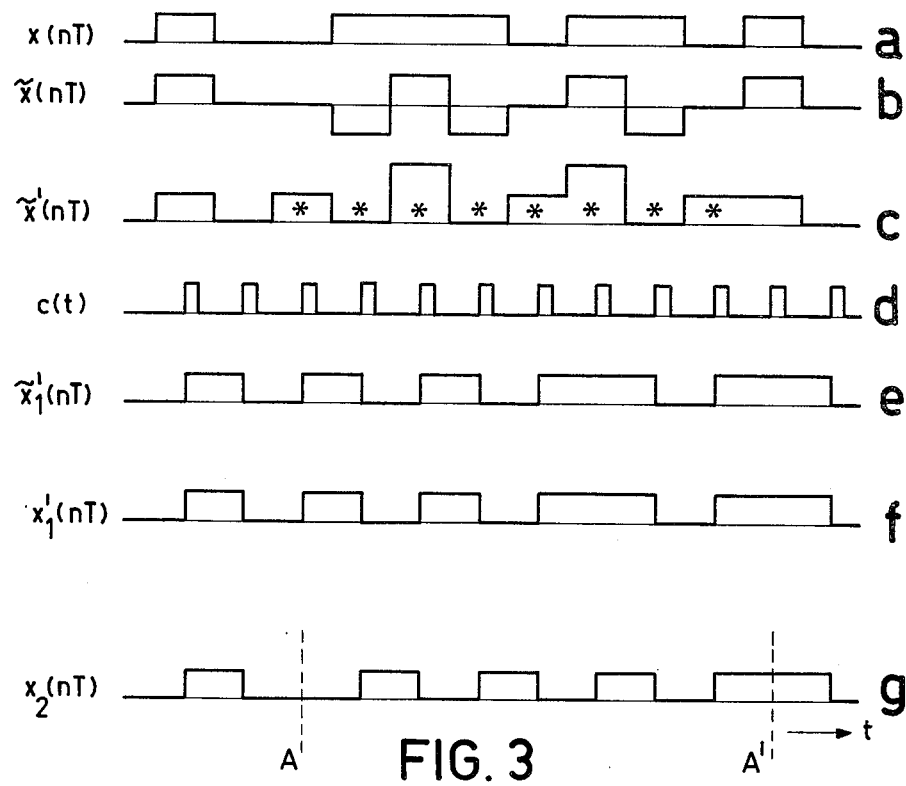
FIG. 3 shows some time diagrams for explaining the receiver shown in FIG. 1 if error bursts occur.

The behavior of the receiver 2 shown in FIG. 1 in the presence of a serious disturbance of the signal $\tilde{x}(nT)$ is illustrated in FIG. 3. In this FIG. 3, at a, the signal $\tilde{x}(nT)$ is shown again and at b the signal produced by the encoder 4, in first order bipolar code. The signal applied to the receiver is shown at c. This signal, denoted by $\tilde{x}'(nT)$, now differs from the signal $\tilde{x}(nT)$ in that the level of the pulses indicated by the symbol* is greatly changed with respect to the original level of these pulses. As a response to this signal $\tilde{x}'(nT)$, the regenerator 5 produces, instead of the signal $\tilde{x}_1(nT)$ shown at d in FIG. 2, the signal $\tilde{x}_1'(nT)$ shown at e in FIG. 3, causing the decoder 7 to produce the signal $\hat{x}_1'(nT)$ shown at f in FIG. 3, which strongly deviates from the desired signal $\hat{x}(nT)$. As the signal $\tilde{x}_1'(nT)$, applied to the decoder 7, does not satisfy the first-order bipolar code rule, the output pulses of pulse generator 15 are applied to the D/A-converter 14 instead of the pulses associated with this disturbance. The signal applied to the D/A-converter 14, which signal will be denoted as $\hat{x}_2(nT)$, is shown at g in FIG. 3. The pulses indicated in this time diagram and occurring between the instants indicated by A and A' now originate from the pulse generator 15.

Although, normally, replacing a disturbed bit pattern by a different bit pattern will not result in an improvement in the transmission quality, an improvement is, however, indeed obtained with the arrangement shown in FIG. 1, as disturbances of the rest pattern of the delta modulator occurring, for example, during speech intervals are substantially fully suppressed therein. Disturbances of this rest pattern can, namely, be very annoying during speech transmission.

Figure 4:
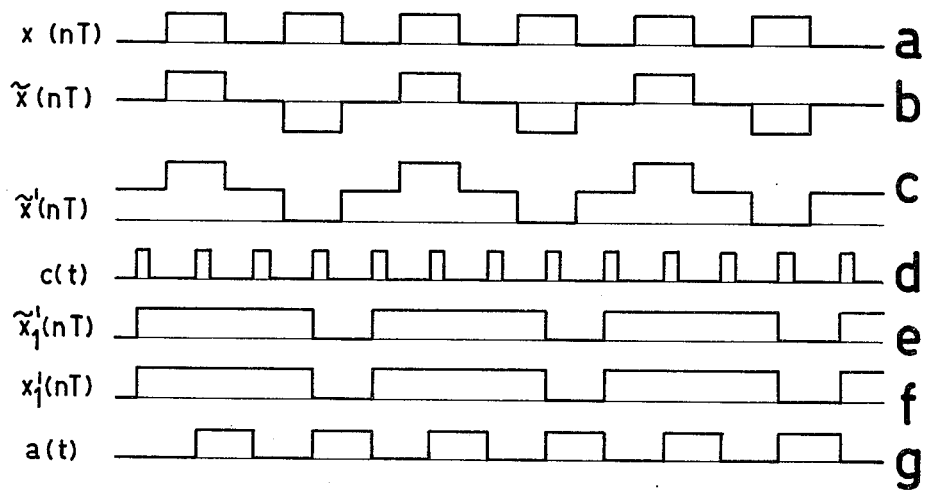
FIG. 4 shows some time diagrams for explaining the receiver shown in FIG. 1 if a delta modulation rest pattern subjected to bursts is applied to this receiver.

The effect of a disturbance of the delta modulator rest pattern will now be described with reference to the time diagrams shown in FIG. 4. In this FIG. 4, a delta modulation rest pattern is indicated at a namely the . . . 0101 . . . pattern. This signal, produced by the delta modulator 3 is again denoted as $\tilde{x}(nT)$. This signal is converted by the first-order bipolar encoder 4 into the signal $\tilde{x}(nT)$ shown at b, which, at a serious disturbance in the transmission medium, changes into the signal $\tilde{x}'(nT)$ shown at c. The signal $\tilde{x}_1'(nT)$, which now has the shape shown at e in FIG. 4, is again obtained at the output of the regenerator 5 and the signal $\hat{x}_1'(nT)$, shown at f, is again obtained at the output of the decoder 7. It will be obvious that replacing the signal shown at f by the signal a(t) shown at g and produced by the pulse generator 15 will be accompanied by a considerable reduction in the audibility of the disturbances.

Figure 5:
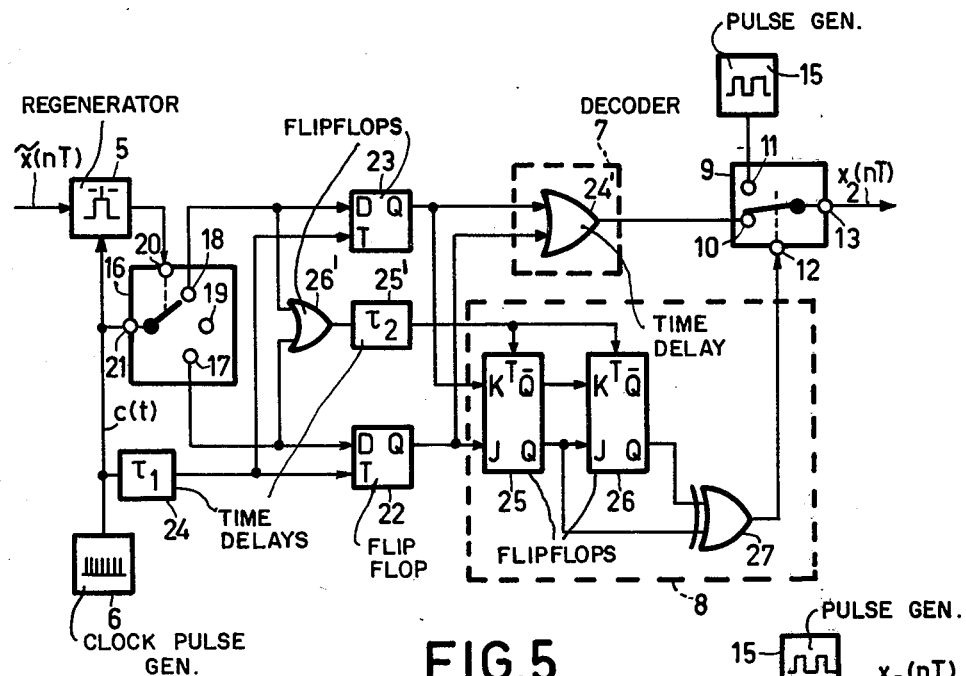
FIG. 5 shows a detailed embodiment of a receiver, used in the transmission system shown in FIG. 1.

E(2). The decoder and the line-code violation detector for the first-order bipolar line code FIG. 5 shows a detailed embodiment of a receiver for use in the transmission system shown in FIG. 1. In this FIG. 5 elements corresponding to elements of FIG. 1 have been given the same reference numerals as in FIG. 1. As for FIG. 1 it is here likewise assumed that the received signal is encoded in accordance with the first order bipolar code.

The receiver shown in FIG. 5 also comprises the pulse regenerator 5 controlled by the output signals c(t) of the clock pulse generator 6. The pulses produced by this pulse regenerated 5 are applied to a switching device 16, shown schematically only, which comprises the two outputs 17 and 18 and, possibly, a third output 19. In addition it comprises two inputs 20 and 21. The output pulses of the regenerator 5 are now applied to the input 20 and the clock pulses c(t) to the input 21. The switching device operates as follows. Each time the regenerator produces an "+1" pulse the output 17 is connected to the input 21, each time the regenerator produces a "−1" pulse the output 18 is connected to the input 21 and each the regenerator produces an "0" pulse the output 19 is connected to the input 21.

Connected respectively to the outputs 17 and 18 of the switching device 16 are flip-flops 22 and 23, for example D-type flip-flops. The clock pulse inputs T of these D-type flip-flops are both connected, through a delay device 24, to the clock pulse generator 6. The time delay $\tau_1$ of this delay device 24 is a fraction of the period T of the pulses in the clock pulse signal c(t). The use of the elements 16, 22, 23 results in that each time the regenerator 5 produces a "+1" pulse, a "+1" pulse occurs at the output of the flip-flop 22 with a pulse duration equal to T, and each time the regenerator 5 produces a "−1" pulse, a "+1" pulse occurs at the output of the flip-flop 23, which pulse will also have a pulse duration of T. If, however, the regenerator 5 produces a "0" pulse, both the flip-flop 22 and the flip-flop 23 produce a "0" pulse.

In the embodiment shown in FIG. 5 the decoder 7 is constituted by an OR-gate 24' to which the output pulses of the flip-flops 22 and 23 are applied so that the full-wave rectified version of the output signal of the regenerator 5 occurs at the output of this OR-gate 24'. In this embodiment the line-code violation detector 8 is constituted by two cascade-arranged flip-flops 25 and 26, each for example, of the JK-type, whose clock pulse inputs are connected to the output of an OR-gate 26' through a delay device 25', the two inputs of this OR-gate 26' being connected to the output 17 and the output 18, respectively, of the switching device 16. The time delay $\tau_2$ of this delay device 25' is a fraction of the clock pulse period T. In addition, the K-input of the flip-flop 25 is connected to the output of the D-type flip-flop 23 and its J-input to the output of the D-type flip-flop 22. The Q-outputs of these JK-type flip-flops are connected to inputs of an exclusive OR-gate 27 which produces a "0" pulse for the period of time the signal produced by the regenerator 5 does not satisfy the first-order bipolar code rule. This "0" pulse is applied to the control input 12 of the switching device 9, in response whereto its output 13 is connected to the output of the pulse generator 15. If the signal produced by the regenerator 5 does satisfy the bipolar code, then the exclusive-OR-gate 27 produces a "+1" pulse in response whereto the output 13 of the switching device 9 is connected to the output of the decoder 7.

E(3). The encoder and the line-code violation detector for "split-phase" code

The preceding section describes a decoder and a line-code violation detector which can be used if the first order bipolar code is used as the line code. As described in the reference in paragraph D this bipolar code is only one of the possible line codes. The characteristic feature of the first-order bipolar code is that the "1" pulse occurring in the signal $\bar{x}(nT)$ appears as a "+1" pulse in $\bar{x}(nT)$ if the last occurring "1" pulse in $\bar{x}(nT)$ has appeared as "−1" pulse in $\bar{x}(nT)$. If the last occurring "1" pulse in $\bar{x}(nT)$ has appeared as a "+1" pulse in $\bar{x}(nT)$, the next "1" pulse in $\bar{x}(nT)$ appears as a "−1" pulse in $\bar{x}(nT)$. A "0" pulse in $\bar{x}(nT)$ remains a "0" pulse in $\bar{x}(nT)$.

Figure 7:
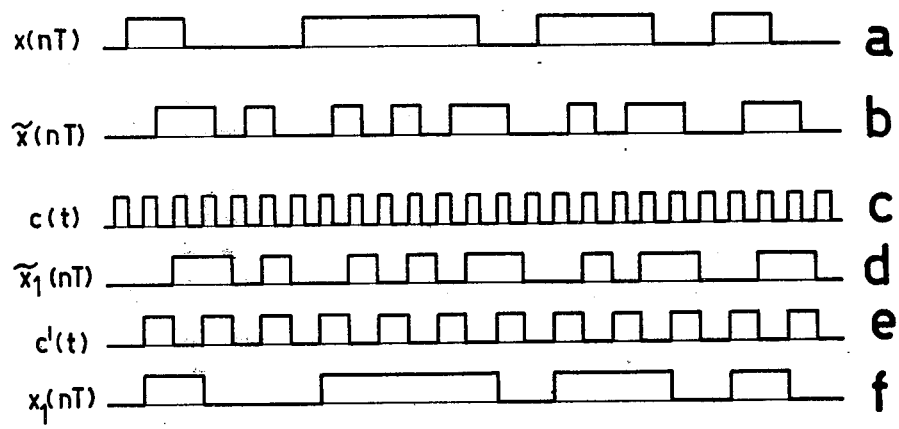
FIG. 7 shows some time diagrams for explaining the receiver shown in FIG. 6.

Another frequently used line code is the so-called split-phase code. In a digital signal whose pulses has a pulse duration T and which is converted in split-phase, each "1" pulse is converted into a pulse combination 01 and each "0" pulse into a pulse combination 10, each pulse in the pulse combination having a pulse duration T/2. If, more particularly, the signal $\bar{x}(nT)$ whose shape is shown at a in FIG. 7, is produced by the A/D converter of the transmitter shown in FIG. 1, the encoder 4 produced in the case of split-phase encoding the signal $\bar{x}(nT)$ whose shape is shown at b in FIG. 7

Figure 6:
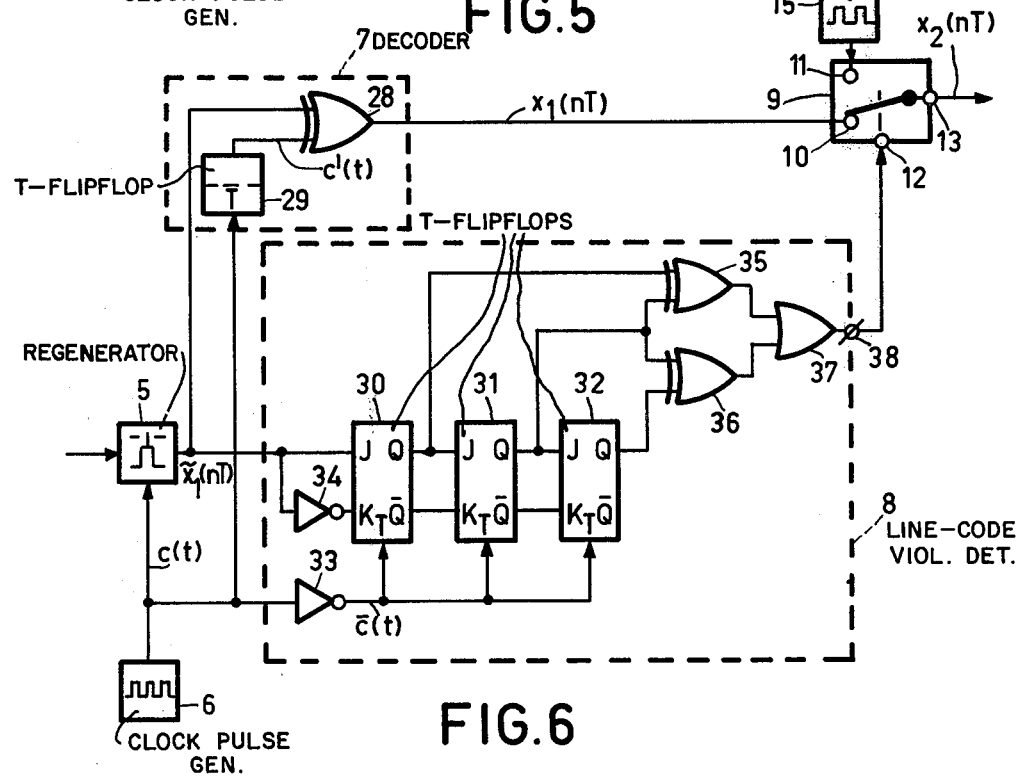
FIG. 6 shows a detailed embodiment of a receiver for the reception of a split-phase signal.

FIG. 6 shows an embodiment of a receiver for use in the transmission system shown in FIG. 1, the output signals of the transmitter being transmitted in split-phase line code. In this figure 6 elements corresponding to those of FIG. 1 have been given the same reference numerals as in FIG. 1.

The receiver shown in FIG. 6 also comprises a pulse regenerator 5 which is controlled by the output signal c(t) of the clock pulse generator 6. In the following description it will be assumed that the signal $\bar{x}(nT)$, shown b in FIG. 7, is applied to the pulse regenerator 5. The clock signals c(t) required for the pulse regeneration has the shape shown at c in FIG. 7. The signal $\bar{x}_1(nT)$ whose shape is shown at d in FIG. 7 is now produced at the output of the pulse regenerator 5. This signal $\bar{x}_1(nT)$ is applied to the decoder 7 and also to the line-code violation detector 8.

In this embodiment the decoder 7 is constituted by an exclusive-OR-gate 28 to which the signal $\bar{x}_1(nT)$ is applied as well as a clock signal c'(t). This clock signal c'(t) is obtained from the output of a T-flip-flop 29 (Toggle flip-flop) to which the clock signal c(t) is applied. The clock signal c'(t) obtained in this manner is shown at e in FIG. 7. In response to the signals $\bar{x}_1(nT)$ and c'(t) the exclusive-OR gate 28 produces the signal shown at f in FIG. 7, whose shape accurately corresponds to the signal x(nT) shown at a in FIG. 7. This output signal of the exclusive-OR gate 28, denoted by $x_1(nT)$, is again applied to the input 10 of the switching device 9. Also this switching device 9 comprises a control input 12, which is connected to the output 38 of the line code violation detector 8.

This line-code violation detector 8 is arranged to detect whether three consecutive bits in the signal $\bar{x}_1(nT)$ are identical to one another. If so, the line code is disturbed and the pulse generator 15 must be connected to the output 13 of the switching device 9. To that end the line-code violation detector 8 comprises a shift register implemented from three JK-type flip-flops 30, 31, 32. The clock inputs of these JK-flip-flops 30, 31, 32 are connected to the output of the clock pulse generator 6 through an inverter 33. The J-input of the flip-flop 30 is connected to the output of the pulse regenerator 5. The K-input of this flip-flop 30 is also connected to the output of the pulse regenerator 5, however, through an inverter 34. The Q-outputs of the flip-flops 30 and 31 are further connected to inputs of an exclusive-OR gate 35 and the Q-outputs of the flip-flops 31 and 32 are connected to the inputs of an exclusive OR gate 36. The outputs of these exclusive-OR gates 35 and 36 are connected to inputs of an OR-gate 37 the output 38 of which constitutes the output of the line-code violation detector 8. The line-code violation detector 8 operates as follows. If the three bits, stored in the flip-flops 30, 32 and 31, of $\bar{x}_1(nT)$ are not all identical to one another, the OR-gate 37 produces a "1" pulse causing the output 13 of the switching device 9 to be connected to the input 10. If, on the contrary, the three bits stored in the flip-flops 30, 31 and 32 are all identical to one another, the OR-gate 37 produces an "0" pulse, causing the output 13 of switching device 9 to be connected to the output of generator 15.

E(4). General remarks

In the preceding it was assumed that immediately after a violation of the line-code was detected, the generator 15 had to be connected to the output 13 of the switching device 9. Because it occasionally happens in a transmission medium that pulses are distorted, it is advantageous to assume the presence of error bursts if, for example, within a given period of time more errors occur than a predetermined number. For this purpose the output 38 of the line-code violation detector 8 shown in FIG. 6, can for example be connected to the control input 12 of the switching device 9 through the condition circuit shown in FIG. 8.

Figure 8:
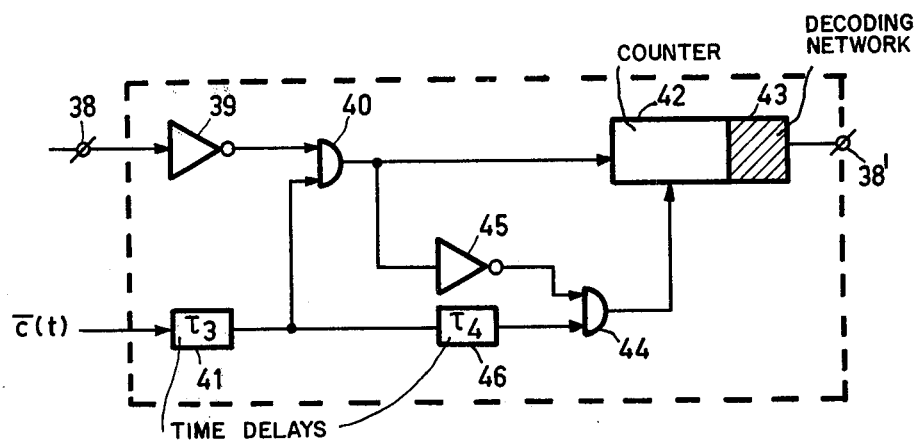
FIG. 8 shows a condition circuit for use in the receiver of FIG. 5 or FIG. 6.

The circuit shown in FIG. 8 comprises an inverter 39 which has its input connected to the output 38 of the line-code violation detector 8. The output of this inverter 39 is connected to the input of an AND-gate 40. This AND-gate 40 also receives clock pulses originating from the inverter shown in FIG. 6 and delayed over a period of time $\tau_3$ by the delay device 41. The output pulses of the AND-gate 40, thus obtained, are applied to a resettable counter 42, whose counter position is increased by one unit step each time the AND-gate 40 supplies a "1" pulse. Connected to this counter 42 is a decoding network 43 which has its output connected to the output 38' of this condition circuit, which in its turn is connected to the control input 12 of the switching device 9. More particularly, a "1" pulse is produced at the output 38' if the counter does not exceed a predetermined counting position. In that case the output 13 of the switching device 9 will then be connected to its input 10. If, on the contrary, the counting position of the counter 42 becomes higher than a predetermined value, the output 38' produces an "0" pulse and the output 13 of the switching device 9 will be connected to its input 11. In addition, the output of AND-gate 40 is connected to the input of an AND-gate 44, namely through an inverter 45. Applied to this AND-gate 44 are the clock pulses originating from the delay device 41 and delayed over a period of time $\tau_4$ by the delay device 46. The pulses produced at the output of this AND-gate 44 are applied to the resetting input of the counter 42. Thus it is achieved that each time the OR-gate 37 produces an "1" pulse, the counter 42 is reset and that a "1" pulse is also produced at the output 38' of this condition circuit. It should further be noted that the time delays $\tau_3$ and $\tau_4$ have been chosen so that their sum $\tau_3 + \tau_4$ is a fraction of the pulse duration of the clock pulses $\bar{c}(t)$ produced by the inverter 33 in FIG. 6.

Although, in the preceding description it is assumed that the pulse generator 15 produces a sequence of alternating "0"-pulses and "1"-pulses, this pulse generator can also be implemented so that it produces a different pulse sequence, for example the pulse sequence . . . 00110011 . . . or that it produces "0" pulses only.

What is claimed is:

1. A receiver for receiving a line signal constituted by a first digital signal, said first digital signal being encoded in a line code and representing a digital version of an analog information signal, the receiver comprising:
   an input for receiving the line signal;
   a decoder coupled to said input and arranged for converting the line signal into said first digital signal;
   a digital-to-analog converter comprising an input;
   means for coupling the input of the digital-to-analog converter to said decoder;
   characterized in that:
   the receiver further comprises:
   the line-code violation detector also coupled to the input of the receiver and arranged to detect whether the line signal deviates from the line code; and
   a generator for generating a second digital signal;
   wherein said coupling means comprises
   a first input coupled to said decoder, a second input coupled to said generator, an output coupled to said digital-to-analog converter, and a control input coupled to said line-code violation detector for selectively coupling said first or second input to said output, whereby when said line-code violation detector indicates a deviation from said line-code, said generator is then coupled to the input of said digital-to-analog converter.

2. A receiver as claimed in claim 1 which further comprises means coupled between said line-code violation detector and said control input of said coupling means, for detecting error bursts, said error bursts being constituted by a series of deviations from said line-code, as detected by said line-code violation detector, occurring within a predetermined period of time, whereby said generator is coupled to said digital-to-analog converter only on the occurrence of an error burst.

* * * * *

Disclaimer 4,276,649.—*Gradus C. Groenendaal* and *Einar A. Aagaard,* Eindhoven, Netherlands. RECEIVER FOR DIGITAL SIGNALS IN LINE CODE. Patent dated June 30, 1981. Disclaimer filed Dec. 14, 1981, by the assignee, *U.S. Philips Corp.*

Hereby enters this disclaimer to all of the claims of said patent.
[*Official Gazette March 2, 1982.*]